United States Patent
Iyengar

(10) Patent No.: US 12,360,002 B2
(45) Date of Patent: Jul. 15, 2025

(54) LOW TEMPERATURE PIPE SYSTEM TESTING

(71) Applicant: AIRBUS OPERATIONS LIMITED, Bristol (GB)

(72) Inventor: Parthasarathy Iyengar, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 233 days.

(21) Appl. No.: 18/167,596

(22) Filed: Feb. 10, 2023

(65) Prior Publication Data

US 2023/0258525 A1    Aug. 17, 2023

(30) Foreign Application Priority Data

Feb. 11, 2022    (GB) ..................... 2201760

(51) Int. Cl.
*G01M 3/00* (2006.01)
*G01M 3/28* (2006.01)
*G01M 5/00* (2006.01)

(52) U.S. Cl.
CPC ............ *G01M 3/28* (2013.01); *G01M 5/0025* (2013.01)

(58) Field of Classification Search
CPC ...... G01M 3/002; G01M 3/28; G01M 3/2807; G01M 3/36; G01M 3/363; G01M 5/0025; G01M 99/002; F25B 9/14
See application file for complete search history.

(56) References Cited

U.S. PATENT DOCUMENTS

| | | | | |
|---|---|---|---|---|
| 5,116,331 | A | * | 5/1992 | Chapman ............ G01L 19/0092 73/756 |
| 2010/0001596 | A1 | * | 1/2010 | Ackermann ........... H02K 55/04 505/166 |

FOREIGN PATENT DOCUMENTS

| | | |
|---|---|---|
| CN | 102297809 | 12/2011 |
| CN | 102645377 | 8/2012 |
| CN | 102854056 | 1/2013 |
| CN | 205164765 | 4/2016 |
| CN | 106970107 | 7/2017 |
| CN | 106996894 | 8/2017 |
| CN | 108871969 | 11/2018 |
| CN | 109297804 | 2/2019 |
| CN | 109490359 | 3/2019 |
| CN | 113406142 | 9/2021 |
| WO | 2017/075712 A1 | 5/2017 |

OTHER PUBLICATIONS

English Translation of CN 205164765 (Year: 2016).*
English Translation of CN 109490359 (Year: 2019).*
Extended European Search Report for Application No. 23154615.1, nine pages, dated Jul. 24, 2023.

(Continued)

*Primary Examiner* — Alexander A Mercado
(74) *Attorney, Agent, or Firm* — Nixon & Vanderhye P.C.

(57) ABSTRACT

A method of testing a pipe system with a testing apparatus is disclosed including a container, a cooling chamber in the container, and a cold head in the cooling chamber. The method includes loading the pipe system into the container; cooling a fluid, such as Helium gas, in the cooling chamber with the cold head to generate a cooled fluid; feeding the cooled fluid into the pipe system in the container; and taking a test measurement of the pipe system containing the cooled fluid.

20 Claims, 2 Drawing Sheets

(56) References Cited

OTHER PUBLICATIONS

Combined Search and Examination Report for Application No. GB 2201760.2 dated Aug. 12, 2022, 8 pages.
Compton et al., "Development of a Cryogenic Mechanical Property Testing Station For Superconducting Rf Cavity Material", AIP Conference Proceedings, 1218, Apr. 23, 2010, pp. 587-594.
Huang et al., "Cryogenic mechanical property testing system directly cooled by G-M cryocooler", Advances in Cryogenic Engineering, AIP Conference Proceedings 1574, 81, (2014), pp. 81-85.
Sas et al., "CRYOMAK—The Overview of Cryogenic Testing Facilities in Karlsruhe", Acta Metallurgica Slovaca, vol. 21, No. 4, (2015), pp. 330-338.
Ogata, "Evaluation of mechanical properties of structural materials at cryogenic temperatures and international standardization for those methods", Advances in Cryogenic Engineering, AIP Conference Proceedings 1574, 320, (2014), pp. 320-326.
Ogata et al., "Review of specimen heating in mechanical tests at cryogenic temperatures", Advances in Cryogenic Engineering, AIP Conference Proceedings 1574, (2014) pp. 86-91.

\* cited by examiner

LOW TEMPERATURE PIPE SYSTEM TESTING

CROSS RELATED APPLICATION

This application claims priority to United Kingdom Patent Application GB 2201760.2, filed Feb. 11, 2022, the entire contents of which is hereby incorporated by reference.

FIELD OF THE INVENTION

The present invention relates to a method of testing a pipe system, and testing apparatus for testing a pipe system.

BACKGROUND OF THE INVENTION

Low temperature testing of a pipe system may be desirable, for instance for an aircraft which uses liquid Hydrogen as a fuel, or for space industry use.

If cryogenic temperatures are required, then this may require the use of a cryogen which can be expensive and hazardous to handle.

SUMMARY OF THE INVENTION

A first aspect of the invention provides a method of testing a pipe system with a testing apparatus, the testing apparatus comprising: a container, a cooling chamber in the container, and a cold head in the cooling chamber, the method comprising: loading the pipe system into the container; cooling a fluid in the cooling chamber with the cold head to generate a cooled fluid; feeding the cooled fluid into the pipe system in the container; and taking a test measurement of the pipe system containing the cooled fluid.

Optionally the cooled fluid flows within the pipe system as the test measurement is taken.

Optionally the testing apparatus further comprises a collection chamber in the container, and the cooled fluid flows from the pipe system and into the collection chamber as the test measurement is made.

Optionally the cooled fluid flows from the pipe system and into the collection chamber via an exit nozzle.

Optionally the cooled fluid comprises a gas.

Optionally the cooled fluid comprises gaseous Helium.

Optionally the cooled fluid is at a temperature below 120K.

Optionally the test measurement is a strain measurement of the pipe system.

Optionally the test measurement is a measurement of the cooled fluid in the pipe system.

Optionally the test measurement is a temperature measurement of the cooled fluid in the pipe system.

Optionally the test measurement is a flow measurement of the cooled fluid in the pipe system.

Optionally the pipe system comprises a pipe bend, and the test measurement is taken at the pipe bend.

Optionally the cooled fluid is fed into the pipe system by one or more impellers.

Optionally the method further comprises evacuating the container.

Optionally the method further comprises evacuating the cooling chamber before loading the fluid into the cooling chamber.

A further aspect of the invention provides testing apparatus for testing a pipe system, the testing apparatus comprising: a container; a cooling chamber in the container; a cold head in the cooling chamber, wherein the cold head is configured to cool a fluid in the cooling chamber to generate a cooled fluid; and one or more impellers configured to feed the cooled fluid into the pipe system from the cooling chamber.

Optionally the testing apparatus further comprises a collection chamber in the container, wherein the collection chamber is configured to collect the cooled fluid as it flows out of the pipe system.

A further aspect of the invention provides testing apparatus for testing a pipe system, the testing apparatus comprising: a container; a cooling chamber in the container; a cold head in the cooling chamber, wherein the cold head is configured to cool a fluid in the cooling chamber to generate a cooled fluid; and a collection chamber in the container, wherein the collection chamber is configured to collect the cooled fluid as it flows out of the pipe system.

Optionally the testing apparatus further comprises a cryocooler configured to cool the cold head.

Optionally the testing apparatus further comprises a vacuum pump configured to evacuate the container.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
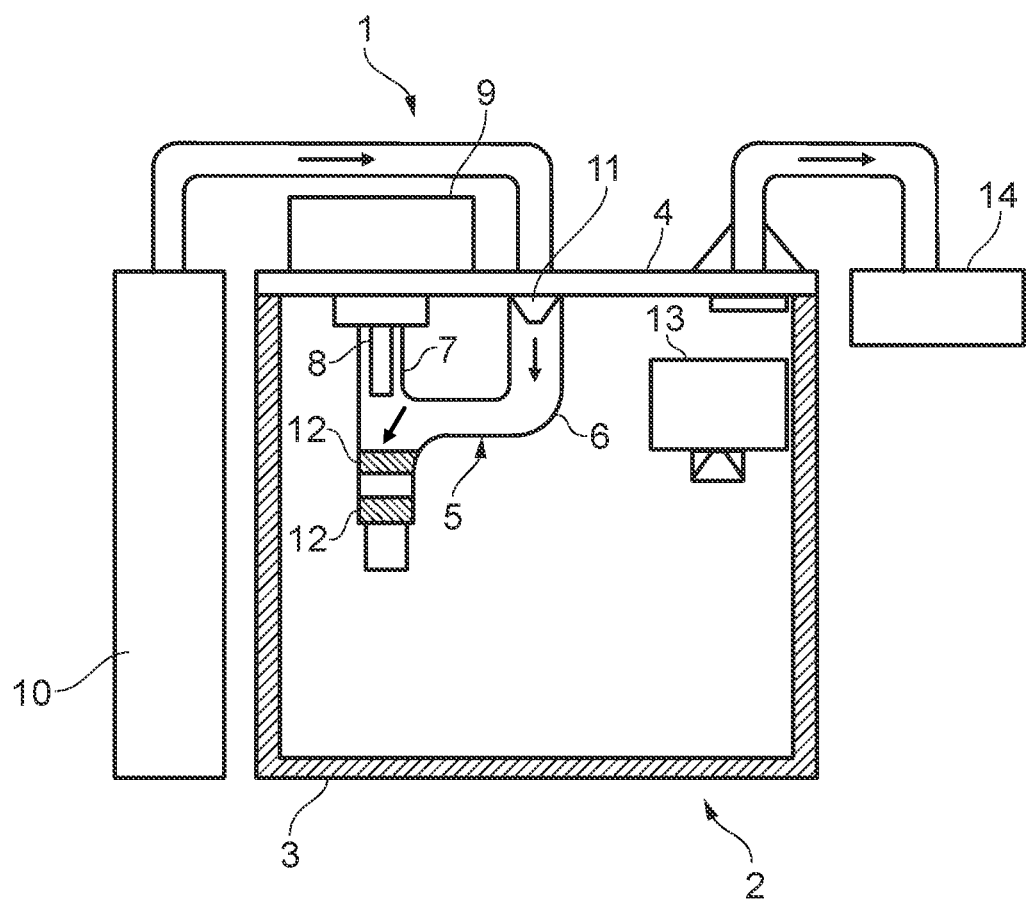
FIG. 1 shows a testing apparatus.

FIG. 1 shows a testing apparatus 1 for testing a pipe system. The testing apparatus 1 may be of table-top size, or larger.

The testing apparatus comprises a thermally insulating container 2, such as a Dewar flask. A Dewar flask, also called a vacuum flask, is an insulating storage vessel that lengthens the time over which its contents remain hotter or cooler than the flasks surroundings. The container 2 comprises a double-walled cylindrical vessel 3, and a lid 4. The vessel 3 has an evacuated cavity between two walls. The lid 4 is formed from an insulating material. The lid 4 may be double-walled or single walled. An appropriate seal (not shown) may be provided between the lid 4 and the vessel 3.

Optionally a layer of liquid nitrogen may be sealed within a second layer of walls of the vessel 3, within the external vacuum between the walls, to assist the maintenance of low temperatures such as 20K. Although this is not depicted in FIG. 1, this will employ limited quantities of liquid nitrogen as cryogen, which must be re-filled as required. This however is significantly less expensive than liquid Helium.

A cooling chamber 5 is mounted in the container 2. The cooling chamber 5 comprises a test elbow 6 and a vertical portion 7. A cold head 8 is mounted in the vertical portion 7 of the cooling chamber 5.

In this example there is only a single cold head 8 in the cooling chamber 5. In other embodiments, multiple cold heads may be provided in the cooling chamber 5.

A cryocooler 9 outside the container 2 is configured to cool the cold head 8. The cryocooler 9 is a refrigerator capable of reaching cryogenic temperatures (below 120K/−153° C.).

The cryocooler 9 contains an entrapped cryogen which undergoes thermodynamic processing as a function of the working principle of the cryocooler. The cryocooler 9 may be of a Stirling, Gifford McMahon or Pulse-Tube type.

The cryocooler 9 typically has an input power less than about 20 kW.

A coolant cylinder 10 contains an inert gas with a low freezing point—typically Helium gas. The coolant cylinder 10 is coupled to the cooling chamber 5 by a flow control valve 11.

The cold head 8 is configured to cool Helium gas in the cooling chamber 5 to generate a cryo-cooled Helium gas (at a temperature of the order of 20K) as will be explained further below.

A pair of impellers 12 are mounted at the bottom of the cooling chamber 5.

A collection chamber 13, typically a cylinder, is provided in the container 2 for collecting the cooled Helium gas as it flows out of the pipe system.

A vacuum pump 14 is provided. The vacuum pump 14 is configured to evacuate the container 2, including the cooling chamber 5 within the container 2.

Figure 2:
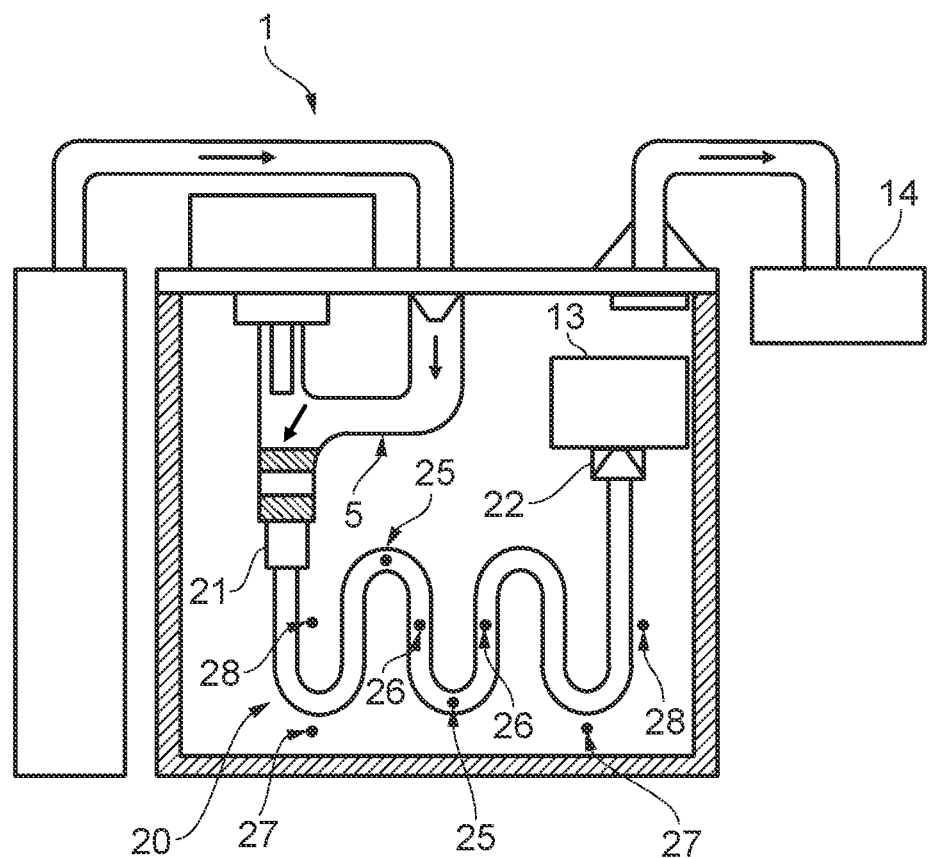
FIG. 2 shows the testing apparatus of FIG. 1 with a pipe system installed.

The testing apparatus 1 can be used to test any pipe system, which may be a single pipe or a network of pipes. FIG. 2 shows an example in which the testing apparatus 2 is arranged to test a pipe system 20 which in this case is a single undulating pipe. The pipe system 20 has a first end with a coupling 21 which connects the pipe system 20 to the cooling chamber 5; and a second end with a coupling 22 which connects the pipe system 20 to the collection chamber 13. The coupling 22 may contain an exit nozzle, or another device for regulating the pressure in the pipe system 20.

The pipe system 20 follows a tortuous or undulating path, with five pipe bends, each pipe bend having a curved central axis. Sensors 25, 26 are provided inside the pipe system 20, and sensors 27, 28 are provided outside the pipe system 20.

The sensor arrangement of FIG. 2 is an example only, and many other sensor arrangements are possible.

By way of example, the sensors 25, 26 inside the pipe system 20 may be flow sensors or temperature sensors. By way of example, the sensors 27, 28 outside the pipe system 20 may be strain gauges or temperature sensors.

After the pipe system 20 has been fitted into the container as shown in FIG. 2 and the lid 4 closed, the vacuum pump 14 is operated to evacuate the interior of the container 2, including the cooling chamber 5.

The flow control valve 11 is then opened to feed Helium gas into the cooling chamber 5. The flow control valve 11 may control the flow rate and/or the pressure, for example.

The cryocooler 9 is then operated to cool the Helium gas in the cooling chamber 5 with the cold head 8 to generate a cryocooled Helium gas at a temperature of the order of 20K.

The cryocooled Helium gas is then fed into the pipe system 20 by the impellers 12. The pressure in the pipe system 20 is controlled by the diameter of the exit nozzle in the coupling 22 and the speed of the impellers 12. When the pressure reaches a desired level, the cryocooled Helium gas flows into the collection chamber 13 via the exit nozzle. Optionally the diameter of the exit nozzle may be adjusted, to change the pressure and/or the flow rate.

The cryocooled Helium gas carries the low temperature from the cold head 8 to the pipe system 20 by convection. The freezing temperature of the cooled fluid (in this case, cryocooled Helium gas) is well below the intended test temperature. The cold head 8 may be optimally positioned to maximize convection of the low temperature.

When the pipe system 20 containing the cryocooled Helium gas is at a desired test pressure, various test measurements of the pipe system 20 containing the cryocooled Helium gas can be made.

Such test measurements may be dynamic test measurements, where the cryocooled Helium gas flows within the pipe system 20 as the test measurement is taken.

The speed of the impellers 12 and/or the diameter of the exit nozzle may be adjusted to control the flow rate of the cryocooled Helium gas through the pipe system 20 during the test measurements.

The sensors 25, 26 inside the pipe system 20 may be flow sensors which are operated to take flow velocity measurements of the cryocooled Helium gas. The sensors 25 take flow measurements at the pipe bends and the sensors 26 take flow measurements at the straight parts of the pipe. Such flow sensors may be used to identify points of stagnation, changes of direction, leak paths, or any other flow characteristics.

The sensors 25, 26 inside the pipe system 20 may be temperature sensors which are operated to take temperature measurements of the cryocooled Helium gas flowing through the pipe system 20. The sensors 25 take temperature measurements at the pipe bends and the sensors 26 take temperature measurements at the straight parts of the pipe.

The sensors 27, 28 outside the pipe may be temperature sensors which are operated to take temperature measurements of the pipe walls of the pipe system 20 as the cryocooled Helium gas flows through the pipe system 20. The sensors 27 take temperature measurements at the pipe bends and the sensors 28 take temperature measurements at the straight parts of the pipe system 20. By way of example, the sensors 27, 28 may be thermal imaging sensors which take thermal images of the pipe walls.

The sensors 27, 28 outside the pipe may be strain gauges which are operated to take strain measurements of the pipe walls of the pipe system 20 as the cryocooled Helium gas flows through the pipe system 20. The sensors 27 take strain measurements at the pipe bends and the sensors 28 take strain measurements at the straight parts of the pipe system 20. The flow of the cryocooled Helium gas may place stresses on the pipe wall (for instance due to thermal contraction of the material) and such stresses can be monitored by such strain measurements.

The temperature and strain test measurements mentioned above may also be repeated as static measurements which are taken when the cryocooled Helium gas is within the pipe system 20, but not flowing as the test measurement is made.

The various dynamic and static measurements mentioned above are examples only, and many other types of test measurement of the pipe system 20 could be taken.

The vacuum pump 14 ensures that the container 2 is at a desired pressure outside the pipe system 20 as the test measurements are made. This enables the pressure difference across the pipe walls of the pipe system 20 to be controlled and adjusted if needed.

When the test is complete, or access to the pipe system 20 is required, the Helium gas is drained by the vacuum pump 14 then the container 2 is brought up to atmospheric pressure to enable the lid 4 to be removed.

In this example, cryocooled Helium gas is contained within the pipe system 20, the cooling chamber 5 and the collection chamber 13, but not in any other part of the container 2. Therefore the pipe system 20 is cooled principally by the cryocooled Helium gas inside the pipe system 20. In an alternative embodiment, cryocooled Helium gas may also be provided in the container 2 in contact with the outside of the pipe system 20, so the pipe system 20 is cooled from the outside as well as the inside.

Optionally the pipe system 20 is a Hydrogen pipe system—i.e. a pipe system capable of carrying liquid Hydrogen at a temperature of the order of 20K. For example the pipe system 20 may be configured for use in a Hydrogen fuel system for an aircraft.

In other embodiments, the pipe system 20 may be configured to carry another liquid or gas, for example liquid Ammonia at a temperature of the order of −40° C. In this case, instead of using cryocooled liquid Helium, another coolant fluid may be used, such as air or liquid Nitrogen.

In the example given above, the cryocooled Helium gas flows into the collection chamber 13. This provides a simple arrangement. In an alternative, the apparatus may be adapted so that the pipe system under test forms part of a closed flow circuit for the cryocooled Helium gas.

The apparatus described above can be used to test a pipe system (such as a fuel pipe) without the use of externally supplied cryogen and with increased safety in comparison with approaches employing direct contact of the pipe system with the cryogen or its vapours or their direct use to produce low temperatures—demanding their continued supply or production in higher volumes. This makes the apparatus cost effective and energy efficient.

Where the word 'or' appears this is to be construed to mean 'and/of' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of testing a pipe system with a testing apparatus, the testing apparatus comprising: a container, a cooling chamber separate from and disposed within the container, and a cold head disposed within the cooling chamber, the method comprising: loading the pipe system into the container; cooling a fluid in the cooling chamber with the cold head to generate a cooled fluid; feeding the cooled fluid into the pipe system in the container; and taking a test measurement of the pipe system containing the cooled fluid.

2. The method of claim 1, wherein the cooled fluid flows within the pipe system as the test measurement is taken.

3. The method of claim 1, wherein the testing apparatus further comprises a collection chamber in the container, and the cooled fluid flows from the pipe system and into the collection chamber as the test measurement is made.

4. The method of claim 3, wherein the cooled fluid flows from the pipe system and into the collection chamber via an exit nozzle.

5. The method of claim 1, wherein the cooled fluid comprises a gas.

6. The method of claim 1, wherein the cooled fluid comprises gaseous Helium.

7. The method of claim 1, wherein the cooled fluid is at a temperature below 120K.

8. The method of claim 1, wherein the test measurement is a strain measurement of the pipe system.

9. The method of claim 1, wherein the test measurement is a measurement of the cooled fluid in the pipe system.

10. The method of claim 9, wherein the test measurement is a temperature measurement of the cooled fluid in the pipe system.

11. The method of claim 9, wherein the test measurement is a flow measurement of the cooled fluid in the pipe system.

12. The method of claim 1, wherein the pipe system comprises a pipe bend, and the test measurement is taken at the pipe bend.

13. The method of claim 1, wherein the cooled fluid is fed into the pipe system by one or more impellers.

14. The method of claim 1, further comprising evacuating the container.

15. The method of claim 1, further comprising evacuating the cooling chamber before loading the fluid into the cooling chamber.

16. A testing apparatus for testing a pipe system, the testing apparatus comprising: a container; a cooling chamber separate from and disposed within the container; a cold head disposed within the cooling chamber, wherein the cold head is configured to cool a fluid in the cooling chamber to generate a cooled fluid; and one or more impellers configured to feed the cooled fluid into the pipe system from the cooling chamber.

17. A testing apparatus according to claim 16, further comprising a collection chamber in the container, wherein the collection chamber is configured to collect the cooled fluid as it flows out of the pipe system.

18. A testing apparatus for testing a pipe system, the testing apparatus comprising: a container; a cooling chamber separate from and disposed within the container; a cold head disposed within the cooling chamber, wherein the cold head is configured to cool a fluid in the cooling chamber to generate a cooled fluid; and a collection chamber in the container, wherein the collection chamber is configured to collect the cooled fluid as it flows out of the pipe system.

19. A testing apparatus according to claim 18, further comprising a cryocooler configured to cool the cold head.

20. A testing apparatus according to claim 18, further comprising a vacuum pump configured to evacuate the container.

* * * * *